US011945025B1

(12) United States Patent
Breneman et al.

(10) Patent No.: US 11,945,025 B1
(45) Date of Patent: Apr. 2, 2024

(54) METHOD OF WALL CONTROL IN MULTI-WALL INVESTMENT CASTING

(71) Applicant: Raytheon Technologies Corporation, Farmington, CT (US)

(72) Inventors: Ryan C. Breneman, Newington, CT (US); Markian Stephan Blazejowskyj, Wethersfield, CT (US); Blake Matthew Wilmore, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/131,611

(22) Filed: Apr. 6, 2023

(51) Int. Cl.

| | |
|---|---|
| ***B22C 9/04*** | (2006.01) |
| ***B22C 9/10*** | (2006.01) |
| ***B22C 9/12*** | (2006.01) |
| *B22C 9/26* | (2006.01) |
| *F01D 5/18* | (2006.01) |

(52) U.S. Cl.
CPC ................ *B22C 9/04* (2013.01); *B22C 9/103* (2013.01); *B22C 9/12* (2013.01); *B22C 9/26* (2013.01); *F01D 5/187* (2013.01); *F05D 2230/21* (2013.01)

(58) Field of Classification Search
CPC .. B22C 9/04; B22C 9/103; B22C 9/12; B22C 9/26; B22C 21/14
See application file for complete search history.

(56) References Cited

U.S. PATENT DOCUMENTS

| | | | |
|---|---|---|---|
| 6,739,381 | B2 | 5/2004 | Esser et al. |
| 9,550,230 | B2 | 1/2017 | Lutjen et al. |
| 9,963,976 | B2 | 5/2018 | Alpan |
| 10,300,526 | B2 | 5/2019 | Propheter-Hinckley et al. |
| 2018/0161851 | A1* | 6/2018 | Propheter-Hinckley .................... B22C 9/10 |

* cited by examiner

*Primary Examiner* — Kevin P Kerns
*Assistant Examiner* — Steven S Ha
(74) *Attorney, Agent, or Firm* — Bachman & LaPointe, P.C.

(57) ABSTRACT

A casting method includes passing a metallic spacer through respective apertures in at least two ceramic cores to an installed condition wherein the spacer defines a minimum local separation between the at least two cores. The spacer has a shank and at least one arm extending from the shank. A sacrificial pattern material is molded over the metallic spacer and the at least two ceramic cores and then shelled and fired. An alloy is cast in the shell the shell is removed from the cast alloy.

22 Claims, 11 Drawing Sheets

METHOD OF WALL CONTROL IN MULTI-WALL INVESTMENT CASTING

BACKGROUND

The disclosure relates to gas turbine engines. More particularly, the disclosure relates to investment casting using ceramic casting cores.

Gas turbine engines (used in propulsion and power applications and broadly inclusive of turbojets, turboprops, turbofans, turboshafts, industrial gas turbines, and the like) typically include components cast over ceramic cores to form internal passageways in the components. When multiple ceramic cores are used to create multiple passageways separated by multiple walls, precise positioning of the cores can be critical to provide precise control of wall thickness. The cores must be precisely positioned during the overmolding of pattern material (e.g., wax) and subsequent stucco shelling, dewaxing, and shell firing to leave the cores precisely positioned within the resulting casting shell. For such core positioning, a number of technologies have been used or proposed. One technology involves integrally molded bumpers protruding from one core to contact another core or the pattern mold/die. Another technology involves use of metallic pins (e.g., platinum) to position the cores.

SUMMARY

One aspect of the disclosure involves a casting method comprising: passing a metallic spacer through respective apertures in at least two ceramic cores. The spacer has a shank and at least one arm extending from the shank. The passing is to an installed condition wherein the spacer defines a minimum local separation between the at least two cores. A sacrificial pattern material is molded over the metallic spacer and the at least two ceramic cores. The sacrificial pattern material is shelled. A shell formed by the shelling is fired. Alloy is cast in the shell. The shell is removed from the cast alloy.

In a further embodiment of any of the foregoing embodiments, additionally and/or alternatively, the passing comprises: insertion; and relative rotation of the spacer and at least one of the at least two ceramic cores to shift the at least one arm of the spacer to the installed condition.

In a further embodiment of any of the foregoing embodiments, additionally and/or alternatively, the apertures are elongate openings between legs of each core.

In a further embodiment of any of the foregoing embodiments, additionally and/or alternatively, the at least two cores are at least three cores.

In a further embodiment of any of the foregoing embodiments, additionally and/or alternatively, the method casts a multi-walled airfoil element; and the core legs cast several arrays of spanwise passages stacked between the pressure side of the airfoil and the suction side of the airfoil.

In a further embodiment of any of the foregoing embodiments, additionally and/or alternatively, the method casts a heat exchanger and the at least three cores are at least four cores arranged in two interleaved tiered arrays with legs of the first array transverse to legs of the second array so as to provide cross-flow heat exchange in the heat exchanger.

In a further embodiment of any of the foregoing embodiments, additionally and/or alternatively, for each core, the legs are connected to each other at at least one end.

In a further embodiment of any of the foregoing embodiments, additionally and/or alternatively, a preheat of the casting melts the spacer.

In a further embodiment of any of the foregoing embodiments, additionally and/or alternatively, the sacrificial pattern material is removed before the firing.

In a further embodiment of any of the foregoing embodiments, additionally and/or alternatively: the at least two ceramic cores are at least one first ceramic core and at least one second ceramic core; and the passing comprises passing through the aperture(s) of the at least one second ceramic core after passing through the aperture(s) of the at least one first ceramic core.

In a further embodiment of any of the foregoing embodiments, additionally and/or alternatively: the spacer has a first end and a second end wherein in the installed condition the first end extends beyond a surface of the sacrificial pattern material; the shelling embeds the first end into the shell; and the firing secures the first end to fix the minimum local separation between the at least two cores.

In a further embodiment of any of the foregoing embodiments, additionally and/or alternatively: the spacer has a first end and a second end wherein during the shelling the first end and the second end extend beyond a surface of the sacrificial pattern material; during the shelling, the first end and second end are embedded into the shell; and the firing secures the first end and second end to fix the minimum local separation between the at least two cores.

A further aspect of the disclosure involves a casting method comprising: inserting a metallic spacer between recesses in two ceramic cores; molding a sacrificial pattern material over the metallic spacer and two ceramic cores; shelling the sacrificial pattern material; firing a shell formed by the shelling; casting alloy in the shell; and removing the shell from the cast alloy.

In a further embodiment of any of the foregoing embodiments, additionally and/or alternatively, the spacer has a melting point of 1200 C to 1500 C.

In a further embodiment of any of the foregoing embodiments, additionally and/or alternatively, the spacer is at least one of platinum or a nickel alloy.

In a further embodiment of any of the foregoing embodiments, additionally and/or alternatively, the spacer is of the cast alloy.

In a further embodiment of any of the foregoing embodiments, additionally and/or alternatively, the spacer comprises a nickel alloy having at least 50% Ni by weight.

In a further embodiment of any of the foregoing embodiments, additionally and/or alternatively, the spacer comprises a material that has a melting point above a cristobalite transformation temperature of a core material.

In a further embodiment of any of the foregoing embodiments, additionally and/or alternatively, the spacer comprises a material that has a melting point below the melting point of the cast alloy.

In a further embodiment of any of the foregoing embodiments, additionally and/or alternatively, the spacer comprises a material that is soluble in the cast alloy.

A further aspect of the disclosure involves A casting method comprising: providing a metallic spacer between two ceramic cores; molding a sacrificial pattern material over the metallic spacer and two ceramic cores; shelling the sacrificial pattern material; firing a shell formed by the shelling; casting alloy in the shell, a preheating melting the metallic spacer; and removing the shell from the cast alloy.

In a further embodiment of any of the foregoing embodiments, additionally and/or alternatively: the heating of the shell transforms amorphous silica in the two ceramic cores to cristobalite; and the spacer melts after at least 50% of said amorphous silica in the two ceramic cores have transformed to cristobalite.

In a further embodiment of any of the foregoing embodiments, additionally and/or alternatively variations may be as those discussed above for the first aspect.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
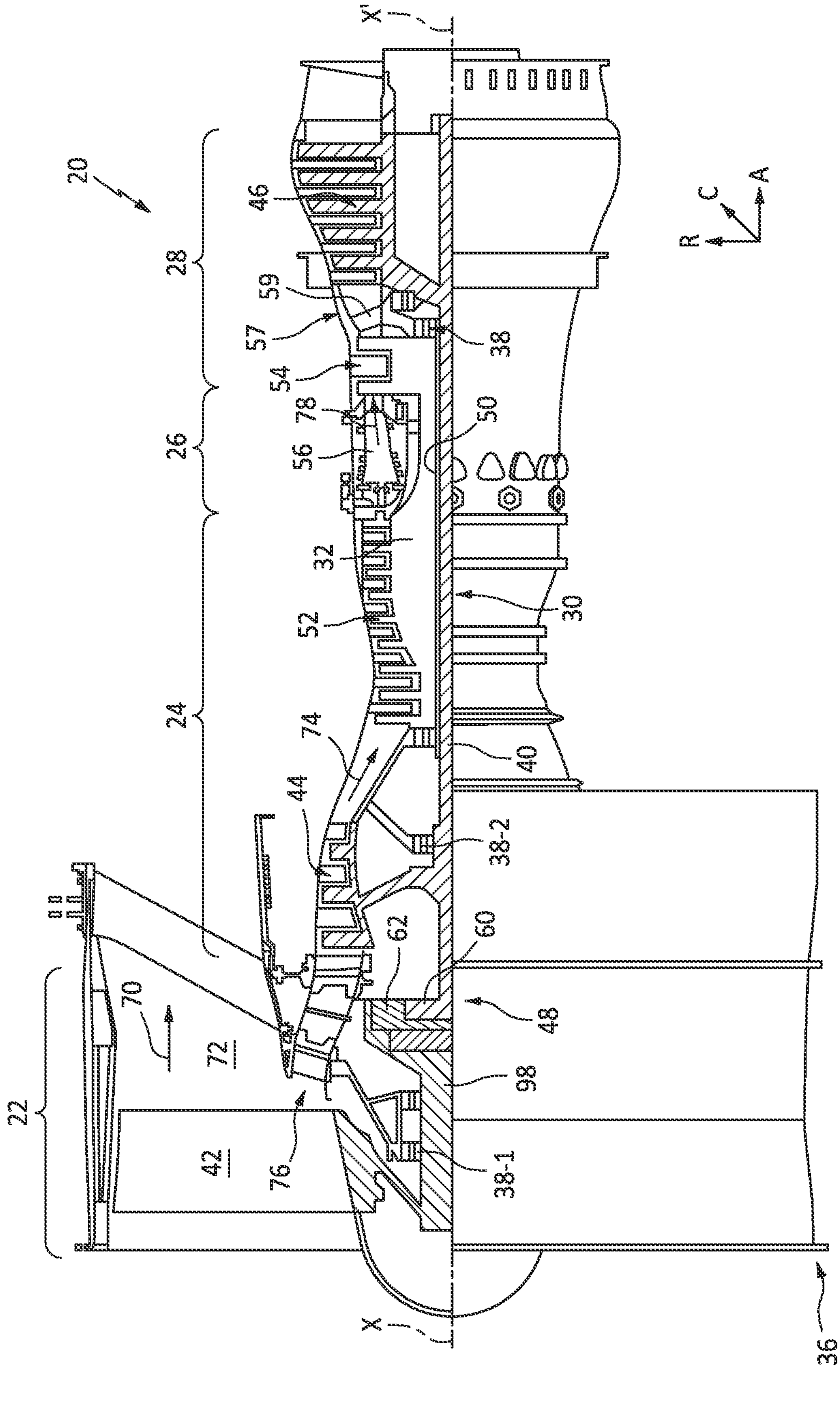
FIG. 1 is a partially schematic longitudinal sectional view of a gas turbine engine.

By way of background and with reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-RC axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air 70 along a bypass flow-path 72 while the compressor section 24 drives air 74 along a core flow-path 76 for compression and communication into the combustor section 26 then expansion 78 through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The gas turbine engine 20 generally comprise a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are examples of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 1A:
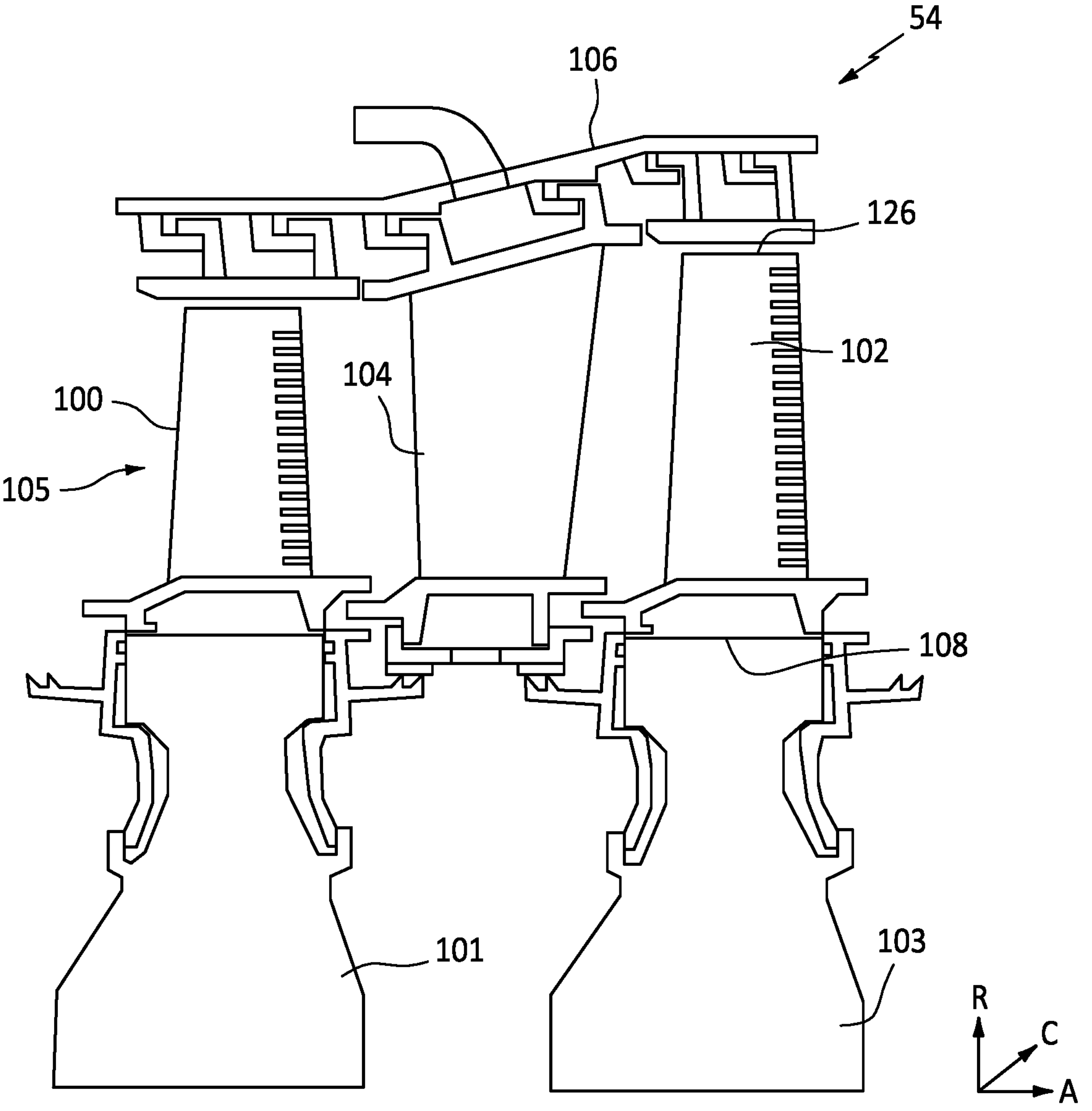
FIG. 1A is an enlarged view of two blade stages and an intervening vane stage of the engine.

Referring now to FIGS. 1 and 1A, the high pressure turbine section 54 may include multiple blades 105 including multiple rows, or stages, of blades including a first blade 100 and a second blade 102, along with rows, or stages, of vanes located therebetween including a vane 104. The blades 100, 102 may be coupled to disks 101, 103 respectively which facilitate rotation of the blades 100, 102 about the axis X-X'. The vane 104 may be coupled to a case 106 and may remain stationary relative to the axis X-X'.

The blade 102 may include an inner diameter edge 108 and an outer diameter edge 126. Due to relatively high temperatures within the high pressure turbine section 54, it may be desirable for the blade 102 (and the vane 104) to receive a flow of cooling air. In that regard, the blade 102 may receive a cooling airflow from the inner diameter edge 108 or the outer diameter edge 126. The blade 102 may define cavities that transport the cooling airflow through the blade 102 to the other of the inner diameter edge 108 or the outer diameter edge 126.

Cooling passages and methods are described with reference to the blade 102. However, one skilled in the art will realize that the cooling passage design implemented in the blade 102 may likewise be implemented in the vane 104, or any airfoil (including a rotating blade or stationary vane) in any portion of the compressor section 24 or the turbine section 28.

Figure 2:
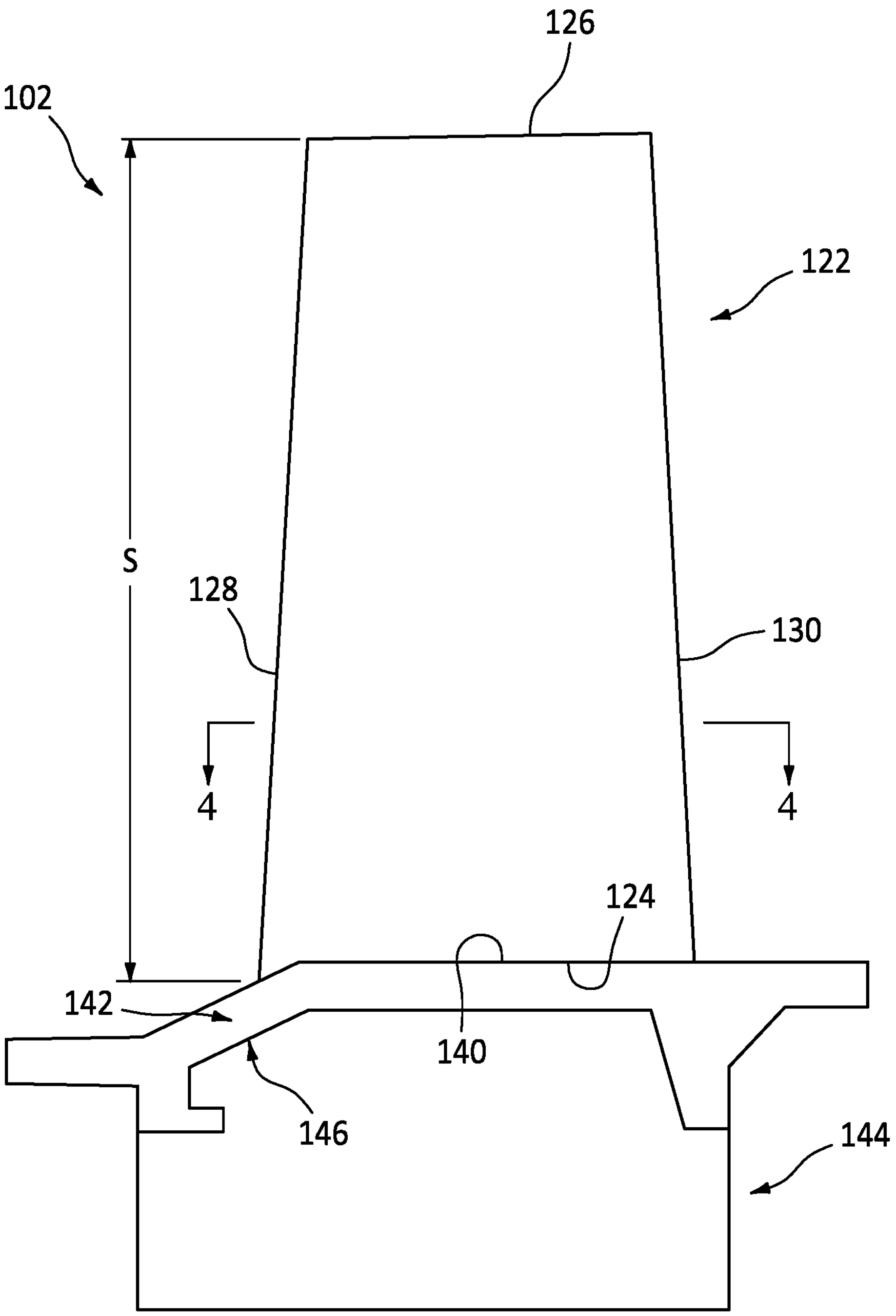
FIG. 2 is a view of a blade of the engine.

Turning now to FIG. 2, an engine turbine element 102 is illustrated as a blade (e.g., a high pressure turbine (HPT) blade) having an airfoil 122 which extends between an inboard end 124, and an opposing outboard end 126 (e.g., at a free tip), a spanwise distance or span S therebetween extending substantially in the engine radial direction. The airfoil also includes a leading edge 128 and an opposing trailing edge 130. A pressure side 132 (FIG. 3) and an opposing suction side 134 extend between the leading edge 128 and trailing edge 130.

The airfoil inboard end is disposed at the outboard surface 140 (FIG. 2) of a platform 142. An attachment root 144 (e.g., firtree) extends radially inward from the underside 146 of the platform.

The example turbine blade is cast of a high temperature nickel-based superalloy, such as a Ni-based single crystal (SX) superalloy (e.g., cast and machined). As discussed further below, an example of a manufacturing process is an investment casting process wherein the alloy is cast over a shelled casting core assembly (e.g., molded ceramic casting cores optionally with refractory metal core (RMC) components). Example ceramics include alumina and silica. The cores may be fired post-molding/pre-assembly. An example investment casting process is a lost wax process wherein the core assembly is overmolded with wax in a wax die to form a pattern for the blade. The pattern is in turn shelled (e.g., with a ceramic stucco). The shelled pattern (not shown) is dewaxed and hardened (e.g., a steam autoclave dewax followed by kiln hardening or a kiln hardening that also vaporizes or volatilizes the wax). Thereafter, open space in the resulting shell casts the alloy.

The blade may also have a thermal barrier coating (TBC) system (not shown) along at least a portion of the airfoil. An example coating covers the airfoil pressure and suction side surfaces and the gaspath-facing surfaces of the platform. An example coating comprises a metallic bondcoat and one or more layers of ceramic (e.g., a YSZ and/or GSZ).

Figure 3:
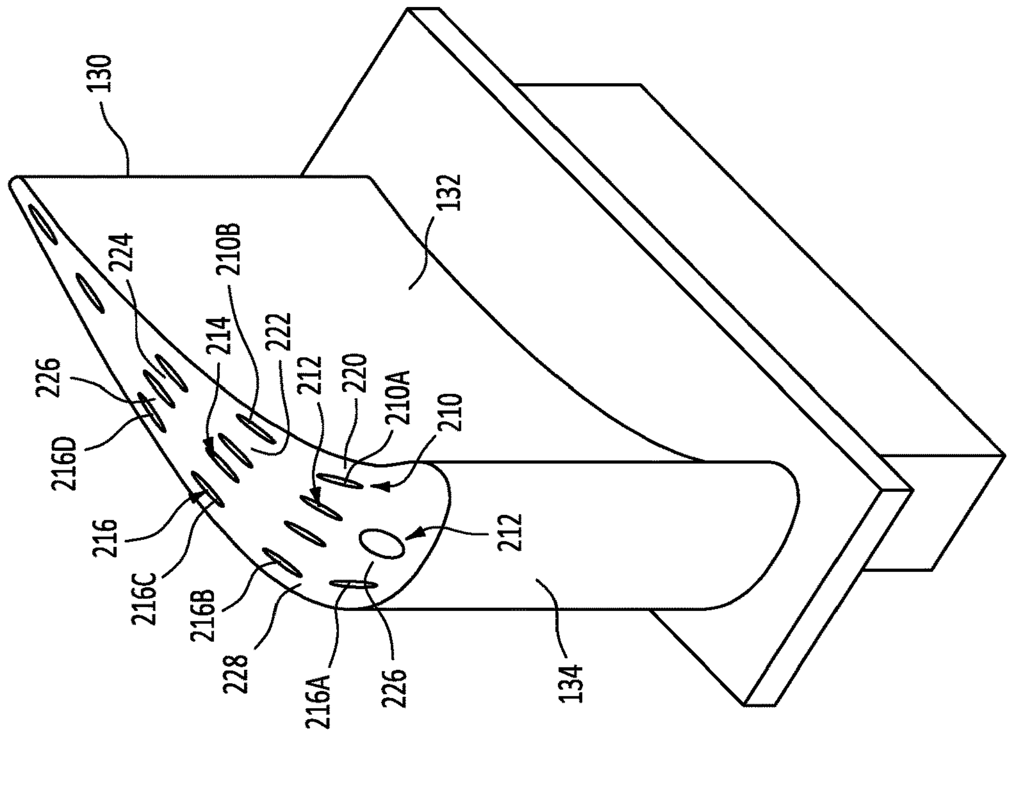
FIG. 3 is a cutaway view of the blade.

FIG. 3 is a cutaway view of a blade showing spanwise cooling passageways. Example cooling passageways are arranged in four groups 210, 212, 214, and 216 from pressure side to suction side thickness-wise. Each of the groups has a different streamwise extent due to the variation in airfoil thickness from leading edge to trailing edge. In this example, one of the intermediate groups extends substantially all the way to the trailing edge. The pressure side group 210 is of relatively small streamwise extent including only an example two passageways 210A, 210B. An example suction side group is of somewhat larger extent including four passageways 216A, 216B, 216C, and 216D. In streamwise areas where all four passageway groups exist, they thus divide five wall sections from a pressure side section 220 to a suction side wall/section 228 with intervening/intermediate walls/sections 222, 224, and 226. Where fewer than the example four groups coincide, the wall/section count is correspondingly reduced.

Figure 4:
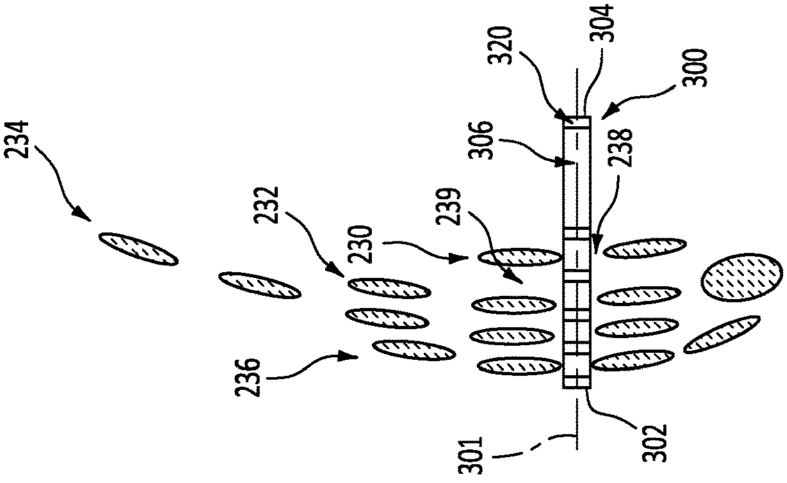
FIG. 4 is a view of a casting core assembly in a first stage of spacer installation.

In manufacture, each group is cast over a respective ceramic casting core. Example cores are molded of silica-based material and subject to finish trimming or other machining. Each casting core has respective spanwise legs corresponding to the spanwise passageway legs of the group. FIG. 4 shows a, from pressure side to suction side: a pressure side core 230 having a pair of legs corresponding to the passageways 210A, 210B; a first intermediate core 232 having legs corresponding to the passageways of the group 212; a second intermediate core 234 having legs corresponding to the passageways of the group 214; and a suction side core 236 having legs corresponding to the passageways 216A-216D of the group 216. Between adjacent legs of a given core, there is a radial/spanwise elongate gap or slot 238. Between adjacent legs of adjacent cores, there are gaps 239. The slots may occupy at least one third or at least one half or at least 75% of the radial/spanwise portion of the associated core within the airfoil section of the blade (e.g., up to 100% or up to 99%).

The core legs of a given core may be connected by core tie sections (not shown). Some of these core ties may be fine connecting sections of the core ceramic between adjacent legs within the region that casts the airfoil. Additionally, at ends of the legs, the legs may be joined by block portions. These block portions may correspond to regions that fall beyond the ultimate blade or other part. For example, they may be spanwise/radially outboard of the tip or spanwise/radially inboard of the inner diameter (ID) extreme of the root and may be embedded in the shell.

In some situations, there may be different combinations of connecting portions. For example, one or more of the cores may lack connecting portions at one or both ends. In one particular group of examples, there may be connecting portions at inner diameter ends that become embedded in the shell but wherein the core legs each cast inlets to the blade root; whereas, the cores may lack connecting portions near radially outboard ends. Such a configuration lacking connections at radially outboard ends may be useful to provide closed ends to the radial passageways cast by the legs rather than having penetrations through the tip which may, in turn, need to be closed such as by caps or welding.

Figure 5:
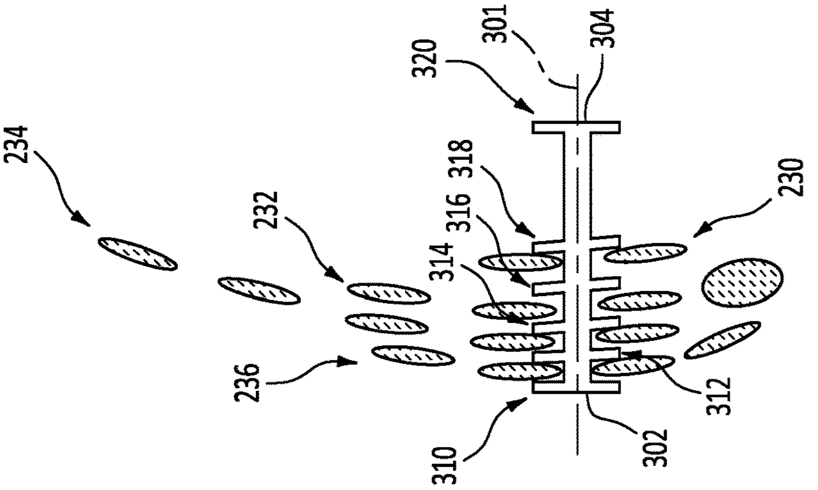
FIG. 5 is a view of the casting core assembly in a second stage of casting core installation.

To maintain precise positioning of the respective associated casting cores for the four groups between the pressure side and the suction side (e.g., maintaining the gaps 219), FIGS. 4 and 5 show the insertion of a spacer or key 300 between the cores. Example spacer 300 extends from a first end 302 to a second end 304. The example spacer has a shaft or shank section 306 from which a plurality of pairs of arms 310, 312, 314, 316, 318, and 320 extend radially outward. The example arms of a pair are diametrically opposite relative to each other. The example arms 320 provide an anchoring feature discussed further below. In this example, the cores are prepositioned and the spacer is inserted with the arms of pairs 310, 312, 314, and 316 extending spanwise so as to pass between core legs. The spacer is then rotated (e.g., by 90°) so that the arms extend approximately streamwise and backlock against the core legs to prevent or restrict/limit relative movement. Depending on implementations, each pair of arms may contact one or both of the adjacent core(s) or be spaced apart by small gap(s). Thus, for example, the arm(s) between two adjacent cores may fix a minimum local spacing by interfacing with the adjacent sides of the cores. Meanwhile, arms outboard of those two cores (along the shaft axis) interfacing with the outboard sides of those two cores may fix the maximum local separation (e.g., the arms 312 of FIG. 5 fix the minimum spacing between the suction side core 236 and the next core 234 whereas the arms 310 and 314 fix the maximum separation).

The arm(s) may take any of numerous forms and need not be paired. They may be symmetric across the axis or may otherwise be shaped. For example, the arms of one or more pairs may be oppositely off radial such as shown. This may be appropriate where the thickness-wise gaps between groups 210, 212, 214, and 216 are not orthogonal to the streamwise gaps between legs of each group through which the shaft extends. In such a situation, the rotation of the spacer may move the cores from an initial relative position to a final relative position.

Depending on core and spacer geometry, various spacer rotations may be used. For diametrically opposed arms, a rotation of approximately 90° may be relevant. The rotation may be highly geometry dependent. Depending upon the shape and relative orientation of the cores, it may not be impractical to achieve an exact 90° rotation and, therefore, much smaller rotations may be appropriate. Thus, examples of nominal 90° are effectively 80° to 100° . But rotations as low as 20° might be still effective.

Figure 7:
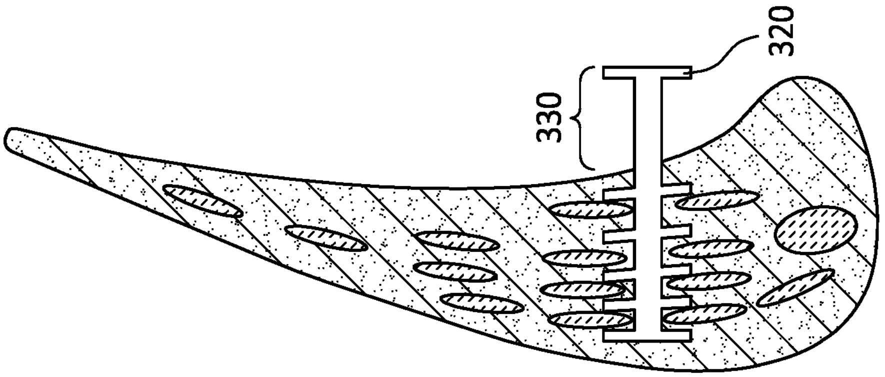
FIG. 7 is a view of a pattern formed by the casting core assembly and wax after wax trimming.
Figure 6:
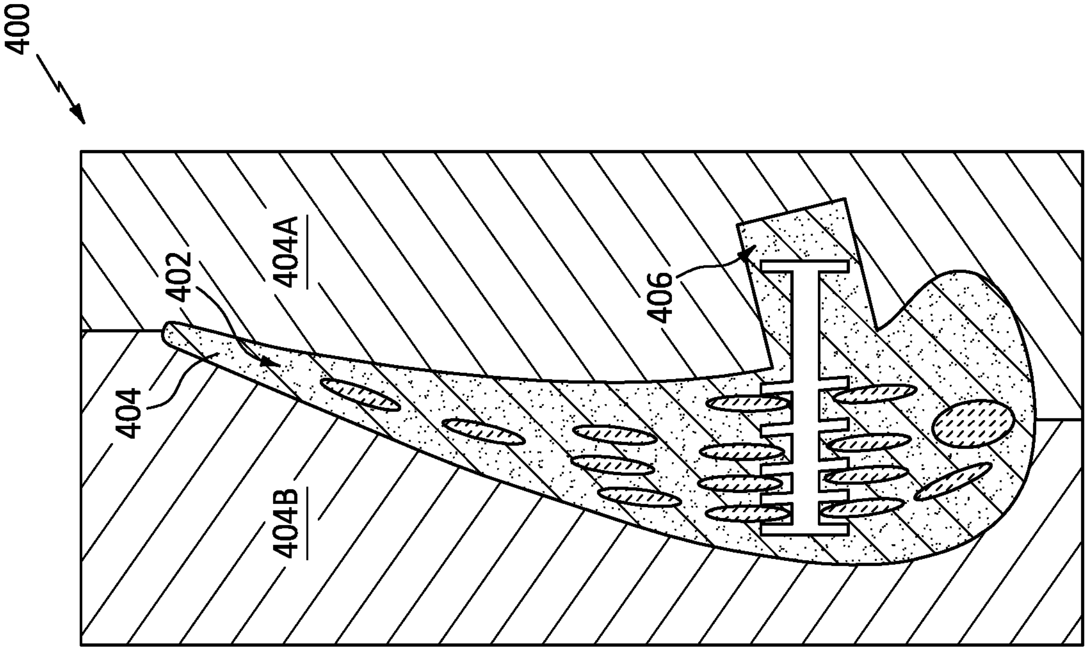
FIG. 6 is a view of the casting core assembly in a wax molding die overmolded with wax.

FIG. 6 shows the core assembly and spacer mounted in a pattern molding die 400 (shown having two pieces 400A and 400B) forming a compartment 402 for overmolding the wax pattern material 404. One end of the spacer is accommodated in a pocket 406 in an associated piece of the pattern molding die. In this example, the pocket 406 is much larger transverse to the spacer axis 301 than the spacer end portion 330 it receives so that a significant volume of wax material is molded around the spacer portion and protruding well beyond the ultimate contour of the airfoil to be cast. In alternative embodiments, there is close accommodation so that little or no wax gets on the protruding portion. Issues of molding die complexity may come into play in choosing the configuration. Where there are multiple spacers, it may not be practical to have the end portions of the spacers all aligned with a pull direction of the associated die pieces. Such alignment is required for a close accommodation. Accordingly, to avoid backlocking of the portions, a larger die compartment may be formed. In such an example situation, after disengaging the die from the pattern, the excess material around the spacer end portion 330 may be manually cut away exposing the spacer end portion (FIG. 7) for subsequent embedding in the shell when the pattern is ceramic stucco shelled so as to lock into the shell material. Example shelling is with an alumina-based material.

Figure 8:
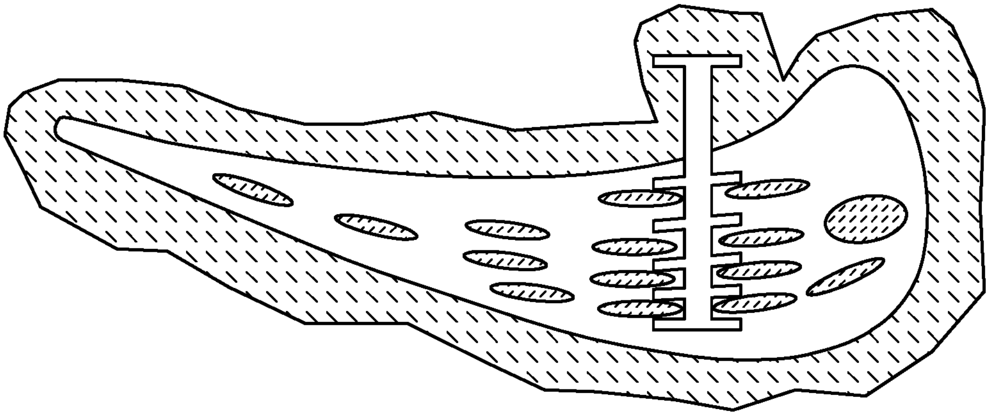
FIG. 8 is a view of a shell containing the casting core assembly and spacer after shelling and dewaxing the pattern.

FIG. 8 shows the resulting shell after release from the die, shelling, dewaxing, and optionally after firing.

One alternate version of this type of spacer would be of length slightly less than thickness of cast component in area used (e.g., lacking the protruding portion 330 and the wax die lacking the compartment 406). Ends would position off of the wax die and then the casting shell interior surface at the part contour. Arms would extend between the multiple cores/core bodies to set internal wall spacing.

Another version would be longer so as to have a second end portion (in addition to/axially opposite the end portion 330) so as to also fit into a die compartment and also finally embed in shell material. This second end portion may also have arms that embed/backlock like 320.

In yet further variations even with an embedded protruding end portion or two such end portions, one or both such end portion(s) may lack the arms or other radially (relative to the spacer/shaft axis 301) outward protrusion. Such a straight end portion may position transverse to the shaft axis 301 while allowing movement parallel thereto at one or both ends.

Additionally, the spacer ends need not be coincident with arm ends or shaft ends (e.g., the shaft may protrude beyond the terminal arm(s) or vice versa).

In general, the spacers may be made of metals or alloys (e.g., uncoated). The example spacer 300 may be made by casting or stamping or additive manufacture or machining such as from rod or bar stock. The main examples of spacer material are nickel-based alloys (e.g., nickel-based superalloys discussed below).

During the casting process, the spacer preferably remains intact at least until the silica-based core has crystallized enough to not deform. Typical state of art cores are primarily composed of amorphous silica which can deform at high temperature until it has crystallized into a more stable crystalline phase (e.g., cristobalite). The initial pre-casting shell firing may not be to a sufficient temperature to do this. The stucco shell (typically alumina- or aluminosilicate-based) is more stable across the temperature range once fired.

Thus the advantageous spacer melting point be above the temperature for core to transform to cristobalite. For typical process parameters such spacer material melting point (e.g., the incipient melting point) may be an example not less than 1200° C. to get into the cristobalite transformation regime and preferably not less than 1300° C. (e.g., 1300° C. to 1500° C. or 1350° C. to 1500° C.) to ensure the spacer supports the cores through the crystalline transformation. Examples in that range are Inconel® (Huntington Alloys Corp., Huntington W. Va.) Alloy 718 (UNS N07718), Inconel® 625 (UNS N06625), and Inconel® 713 (UNS N07713).

In an example process the spacer melts after at least 50% of said amorphous silica (by weight) in the ceramic core(s) has transformed to cristobalite.

The spacers may thus melt before reaching casting temperature. However, it may melt above casting temperature. If spacer melting point is above 1500° C. it must be fully soluble in molten casting alloy. An example is platinum which has a melting point above those of typical cast alloys.

In any of the melting point ranges, the spacer advantageously is soluble into poured casting alloy without detriment. Thus a further example is to form the spacer out of the same alloy as that to be cast.

The foregoing spacer materials and properties may be used for yet other shapes of spacer and installation techniques. This may even include spacer wherein the core(s) are overmolded to the spacer(s).

After the cast alloy cools and solidifies, the casting may be deshelled (e.g., mechanical breaking of the shell) and decored (e.g., thermo-oxidative decoring and/or chemical leaching (e.g., alkaline and/or acid leaching)). And there may be machining (e.g., at least to de-gate, but also including finish machining of key contours such as the root).

Figure 9:
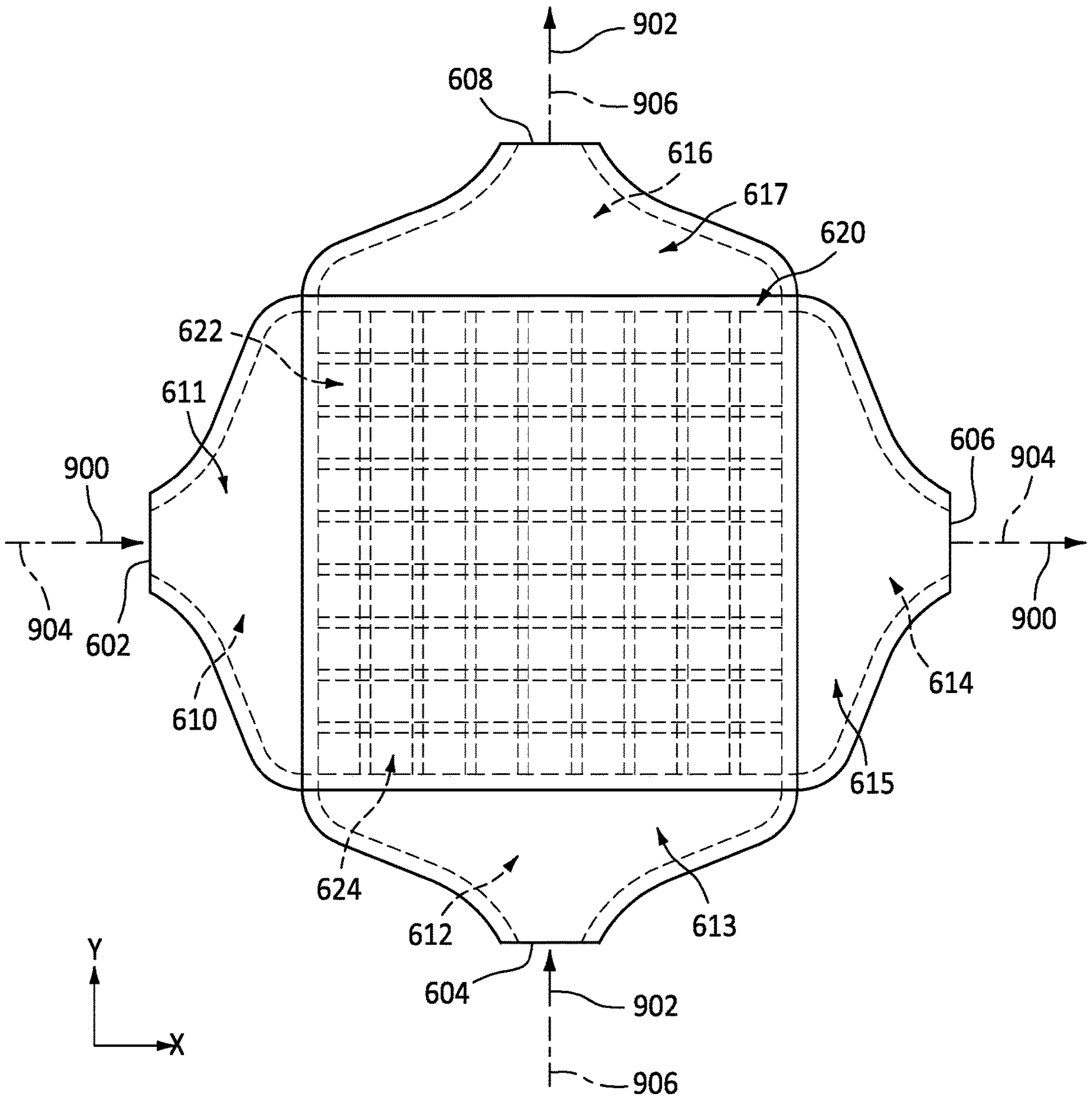
FIG. 9 is a plan view of a heat exchanger with internal details shown in broken lines.

FIG. 9 is a schematic plan view of a crossflow heat exchanger 600. The heat exchanger provides crossflow heat exchange between a first flow 900 along a first flowpath 904 and a second flow 902 along a second flowpath 906. The example flows and flowpaths pass through respective first 602 and second 604 inlet ports and first 606 and second 608 outlet ports. The example inlet ports respectively are to a first inlet plenum 610 and a second inlet plenum 612 and the outlet ports are respectively from a first outlet plenum 614 and a second outlet plenum 616.

A core (section or piece) 620 of the heat exchanger fluidically and physically between the various plena 610, 612, 614, 616 has multiple legs of the first and second flowpaths formed by respective channels in the core. The first flowpath channels/legs are arranged in a first tiered array of rows of channels/legs 622. In this example, the legs of each tier are in-phase with legs of the other tiers. The second flowpath is similarly a tiered array. The second flowpath channels/legs 624 are orthogonal to the first flowpath legs (respective Y and X directions) and the second flowpath tiers alternate with the first flowpath tiers in a spaced-apart stack (Z-direction array).

In a casting example, the core 620 of the heat exchanger may be separately cast from the plenum pieces (shrouds/ducts) 611, 613, 615, 617 and then mounted thereto such as via welding, diffusion brazing, adhesive, bolting (bolts and mating features not shown), and the like. Alternative heat exchangers may form the core unitarily with the one or more plena.

Figure 10:
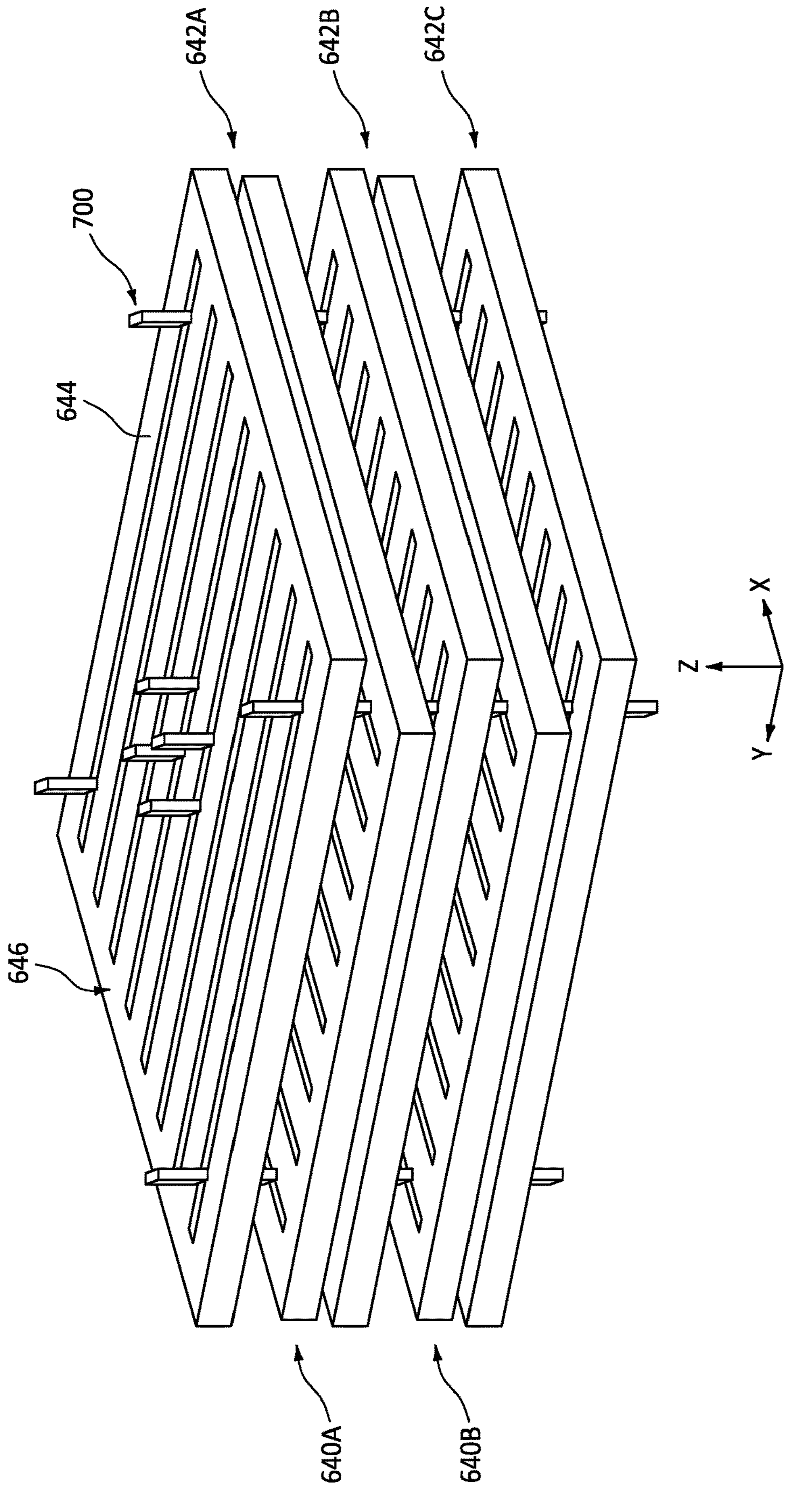
FIG. 10 is a view of a core and spacer assembly for casting a core section of the heat exchanger of FIG. 9.

The core 620 (or heat exchanger having a similar core portion) may be cast via an investment casting process wherein casting cores cast the passageways/legs. For such casting, the casting cores (FIG. 10) 640A, 640B, 642A, 642B, 642C are arranged in tiers complementary to the associated passageway tiers they cast. Thus, there may be a tiered array of casting cores (or casting core sections if unitarily formed with each other such as linking end portions) for each of the first and second flowpaths. The two arrays are alternatingly interleaved. The casting cores have associated segment/legs 644 for casting the associated respective flowpath sections/legs. Ends of the legs 644 are joined by end portions 646 (e.g., shown as connecting bars or connecting legs of a unitarily molded core).

The various cores 640A-640B and 642A-642C may, in some embodiments, be identical to each other or may, in some embodiments, be different. For example, they may have different numbers of legs, different sizes (cross-sectional area) of legs, different shapes or aspect ratios of leg cross-sections, and the like. Additionally, although the example legs are shown of uniform rectangular cross-section, non-uniform sections are possible.

Figure 13:
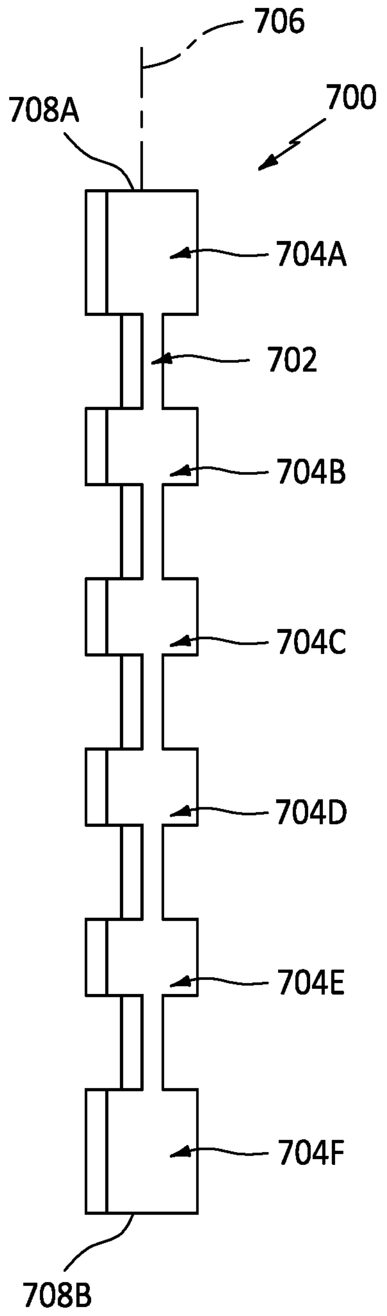
FIG. 13 is a view of a spacer of the core assembly.

For holding the two tiered arrays with a desired stacking spacing, FIG. 13 shows spacers 700 (which in some variations may be similar to the spacers 300 in construction, materials, and use) each having a shaft or shank 702 and a plurality of arms protruding outward from the shaft. The example arms are in diametrically opposite pairs 704A-704F across an axis 706 of the shaft. For this particular implementation the arms of the spacer 700 are shown having a substantially different aspect ratios than the arms of the spacer 300. Thus, the narrowest dimension is shown transverse to the spacer axis whereas the narrowest dimension of the example spacer 300 is parallel to the shaft axis 301. And the arms of the spacer 700 are shown longer in the spacer axial direction than their local protrusion from the shaft in the spacer radial direction; whereas those of the spacer 300 are opposite.

The shaft has a first end 708A and a second end 708B. Proximate the first end, the shaft has a first terminal pair 704A of the arms and proximate the second end, the shaft has a second terminal pair 704F of the arms. Multiple pairs of intermediate arms intervene. With the spacers 700 in an installed condition, each of the pairs of intermediate arms holds a pair of legs of one tier of the first tiered core array apart from one pair of legs of a tier of the second tiered array. The terminal pairs 704A, 704F of arms contact just one pair of legs of one tier. Outboard ends of the spacers (e.g., or terminal pairs of arms) may, during molding, contact a pattern molding die to position the core stack relative to the die.

Installing the example spacers may be via a staged sequence of incremental insertions and incremental rotations. This alternating sequence is related to the relationship between the apertures in the cores (the gaps between the legs of the cores in this example wherein the gaps of one tier are 90° out of phase with those of the adjacent one or two tiers). If all apertures are aligned with each other, a single insertion and single rotation may be appropriate as in the example airfoil embodiment above.

The exact sequence of incremental insertions and incremental rotations may depend on particular assembly techniques and particular details of the physical geometry of the cores and spacers.

Figure 11:
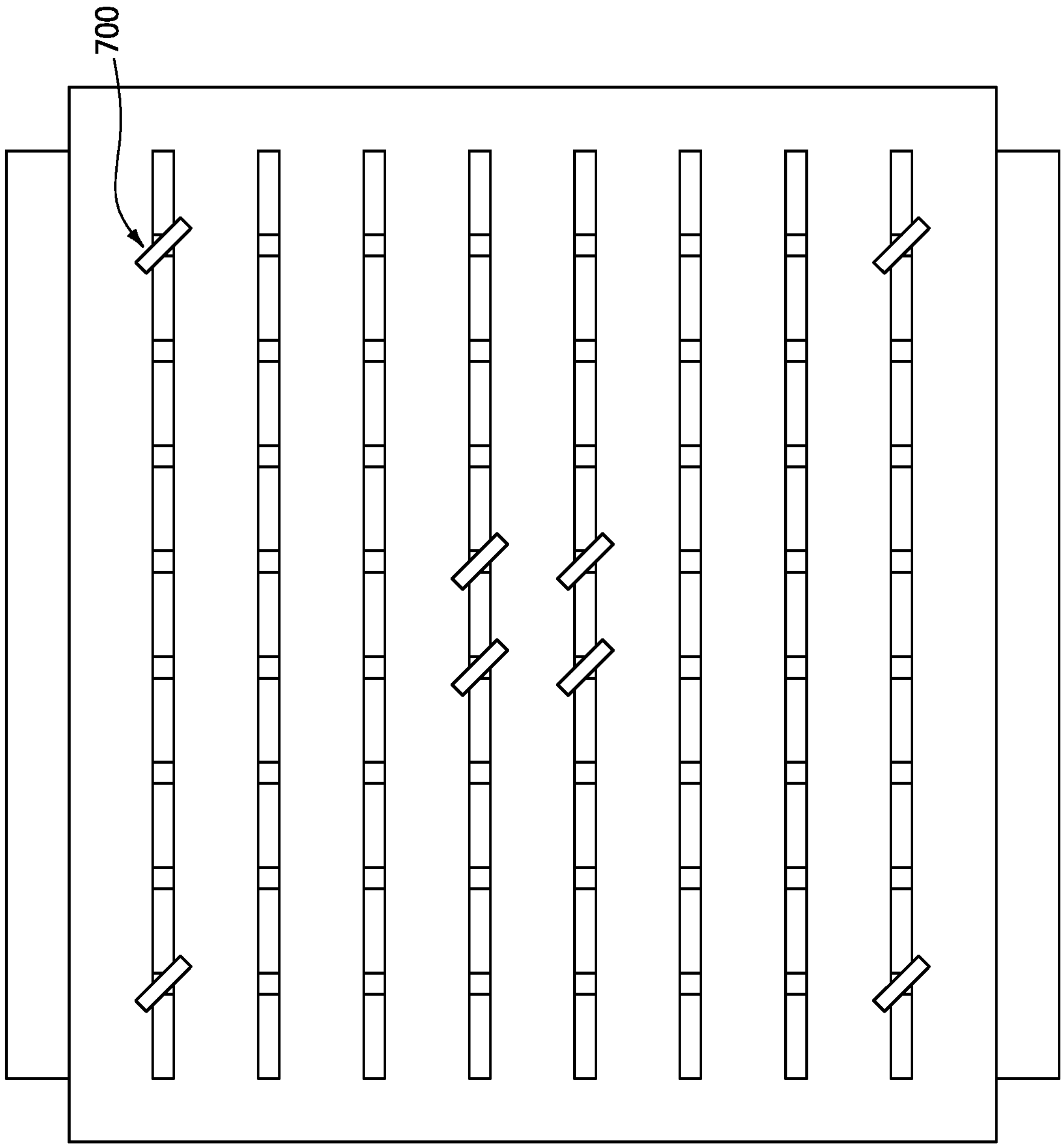
FIG. 11 is a top view of the assembly of FIG. 10.
Figure 12:
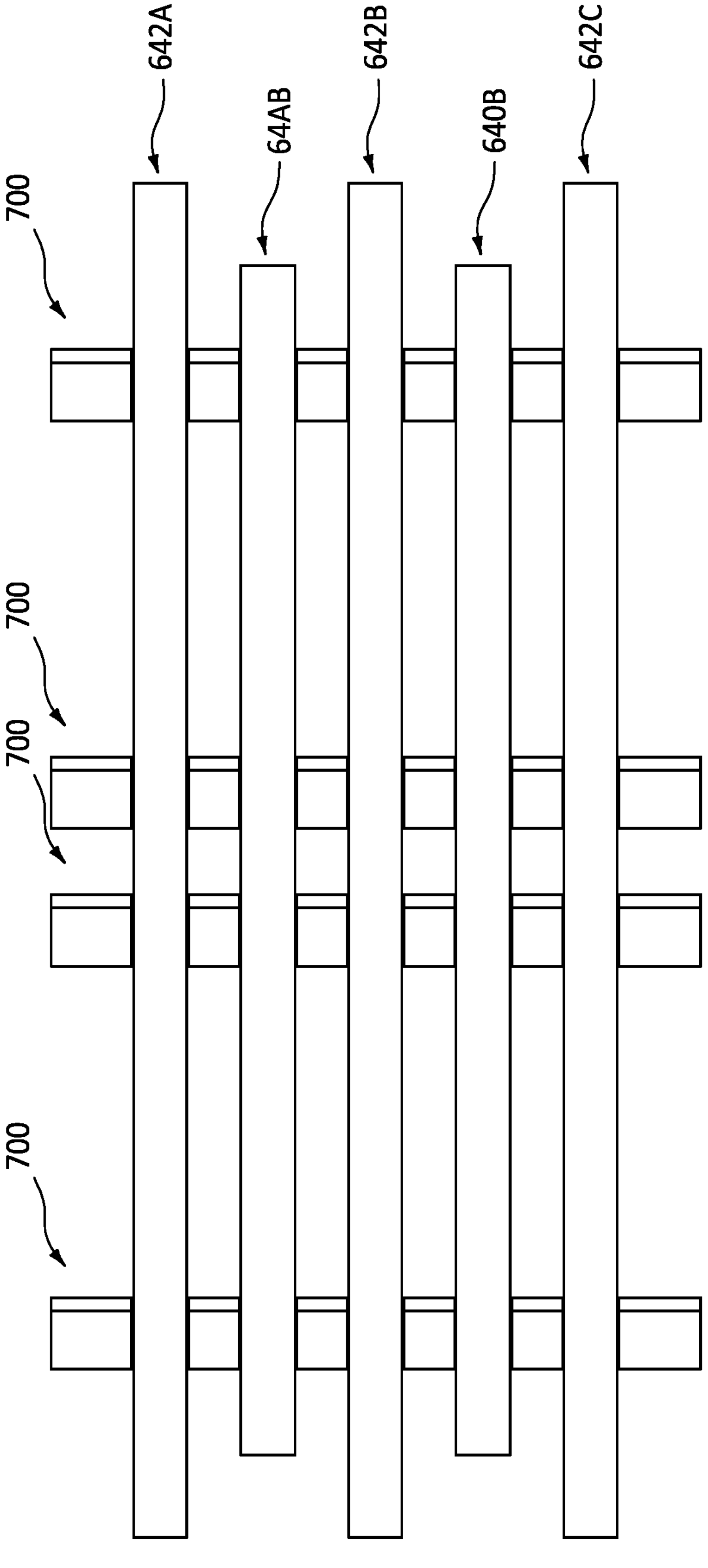
FIG. 12 is a side view of the core assembly.

In one example, the combined two tiered stacks are pre-held in position such as by an external fixture (not shown). Each spacer 700 may then be inserted so that a terminal pair of arms passes between two legs of the adjacent outermost core in the combined stack at one stacking-wise end (Z end) of the stack. This increment of insertion ends when the terminal arms come into contact with the legs of the core of the next tier below (of the other of the two tiered arrays). At that point, there may be a 90° rotation of the spacer. This brings the terminal pair of arms into alignment with a gap between those two legs of said next tier in the combined stack. It thus allows a further insertion by an increment until such arms come into contact with legs of the next tier therebelow. At this point, the adjacent intermediate set of arms will have similarly come into contact with the outermost tier. With the insertion thus stopped, a further 90° rotation (in either direction) similarly disengages the arms from the cores allowing one more increment of insertion and the process continues with more and more of the pairs of arms passing through such engagement with the tiers until the final installed depth (degree of insertion) is reached. At that point, a rotation other than by the 90° increment (e.g., a 45° rotation shown) locks the spacer against further insertion and retraction, thus holding the cores locally spaced apart in their ultimate stack. This is done with multiple spacers to maintain the stack prepositioned across its footprint. FIG. 11 shows an example of spacers near the outer perimeter of the footprint (four—one near each corner) and one or more spacers near the center (again, four in the example).

After such assembly, the core and spacer assembly may be placed in a wax molding die for molding sacrificial pattern material (wax) over the assembly (or the assembly may be partially in the die and the die then closed over the assembly). The wax molding die parts may have small compartments for partially receiving the terminal end pairs of arms of each spacer 700. This holds the spacers in position. However, the partial capture leaves enough length of those arms along the spacer axis to space the adjacent terminal core apart from the wall of the die to allow such space to cast the outer Z wall of the heat exchanger core. Similarly, the adjacent wax molding die parts may have compartments for at least partially receiving the connectors 646. This may, again, help position the core and spacer assembly.

Wax is injected to fill spaces within/around the core assembly and, upon hardening of the wax, the resulting pattern may be released from the die. The release leaves exposed portions of the connectors 646 protruding from the pattern wax (which portions had been captured in compartments in the wax molding die).

The resulting wax-overmolded assembly may then be ceramic stucco shelled to form a shell. The shell may be dewaxed (e.g. steam autoclave) and may be fired to harden (alternatively fire may occur during casting). The dewaxed shell now has a void corresponding to the ultimate raw casting and molten alloy may be poured into the shell to form the casting. The shelling may capture the exposed end portions of the spacers 700 and the exposed portions of the two connectors 646 of each ceramic core in shell material. During the pouring, the spacers may dissolve into the molten casting alloy. In some implementations, however, the spacers may melt during a ramp up prior to pouring the molten alloy. However, such melting or dissolving of the spacers does not effect core position because the end portions of the core connectors 646 are captured by the associated compartments in the shell.

Upon solidification of the alloy, the casting may be deshelled (e.g., mechanical breaking of the shell) and decored (e.g., thermo-oxidative decoring and/or chemical leaching (e.g., alkaline and/or acid leaching)).

Figure 14:
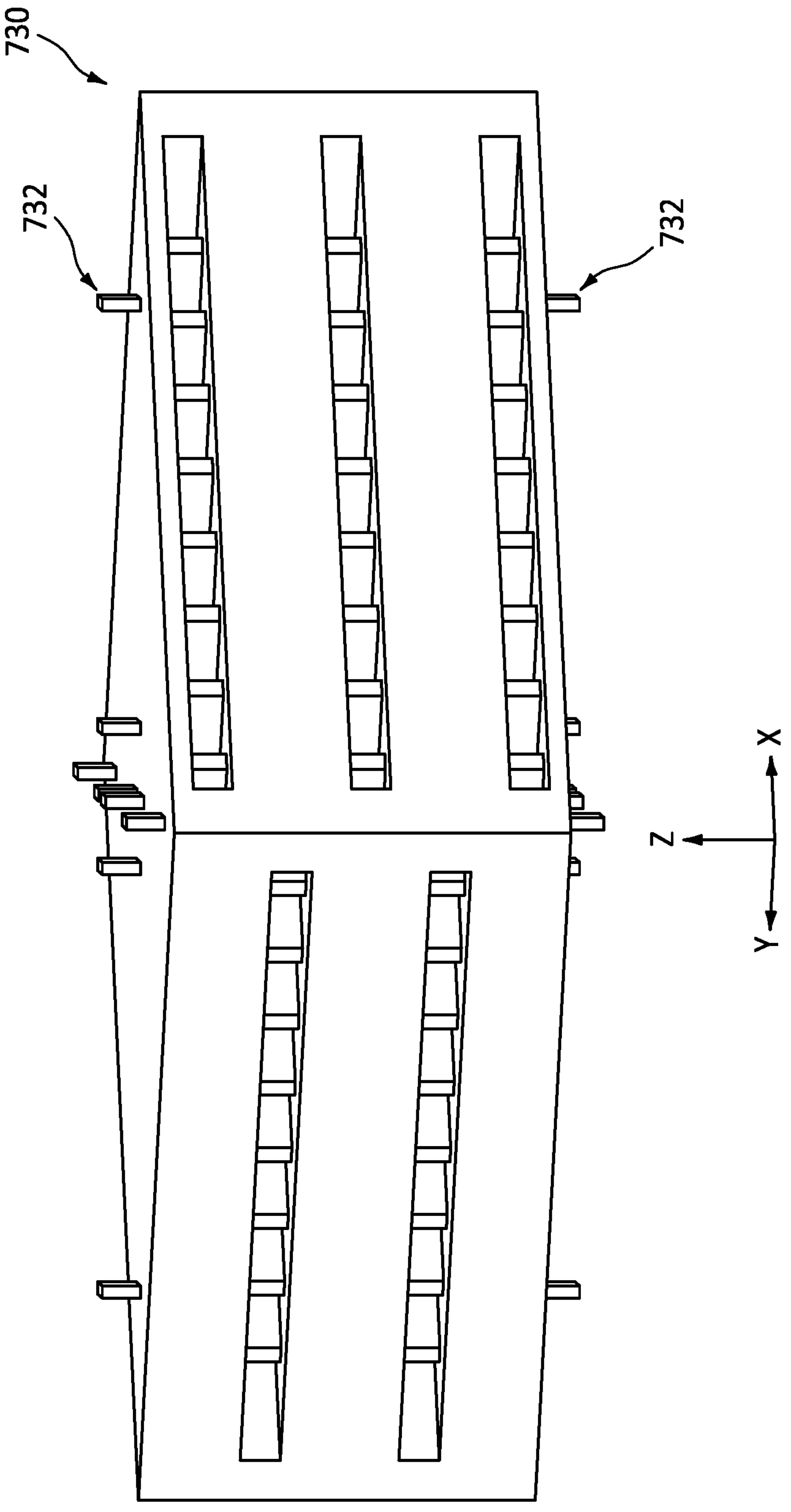
FIG. 14 is a view of a casting of the core section of the heat exchanger.

The raw casting 730 (FIG. 14) may have tabs 732 protruding from the Z-end faces and corresponding to the end portions of the spacers captured by the wax molding die and then associated pockets in the stucco shell. These may be left in place or machined off. Additionally, X-end faces and Y-end faces may be machined to create mating surfaces for the associated plenum/manifold structures 611, 613, 615, 617 (e.g., which may also be cast or, depending upon the situation, may be machined or molded). These may also be of dissimilar (even non-metallic) materials.

From the example shape of the tabs 732, it is seen that the corresponding spacer portions did not mechanically backlock with the shell (e.g., contrasted with T-shaped tabs). However, it shows that the spacers at least position transverse to the spacer axis and prevent rotation about the spacer axis. Furthermore even without such backlocking, there may be some resistance to extraction from adhesion with the shell or thermal interference.

For operation, the heat exchanger inlets and outlets may be coupled to respective sources/flowpaths of the two fluids (e.g. pumped liquids or compressed gasses). The example fluids are liquids.

In alternative embodiments, there may be various asymmetries introduced. These will depend upon the particular use. For example, if the phase of one flow is gas, this may introduce particular size asymmetries and may introduce varying cross-sections of passageway (and associated casting core legs). Even with a liquid-liquid heat exchanger, there may be surface enhancements in the passageways and asymmetries.

An example liquid-liquid heat exchanger in the engine is a fuel preheat heat exchanger wherein one flowpath (heat recipient) contains a flow of fuel from a fuel source (e.g., pumped from a tank) to the engine(s). The other flowpath (heat donor) may be a heat transfer fluid passing along a recirculating flowpath through the engine (e.g., from another heat exchanger such as a gas-liquid heat exchanger where it receives heat). A number of options are available for the heat donor source for the second flowpath depending upon the desired temperature. These include, for high temperature, an exhaust duct downstream of the last turbine or, for slightly elevated temperature, a compressor bleed.

Example casting alloys, spacer alloys, shell material and core material may be similar to those of the blade given above. Process parameters may also be similar.

Although several embodiments have been disclosed, additional embodiments are possible and may include recombining in different combinations structural features and manufacture method parameters and use method parameters of the different embodiments. For example, options applicable to the illustrated blade may be applicable to heat exchangers and options for the illustrated heat exchanger may be applicable to blades or other airfoil components such as vanes or yet other components altogether.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A casting method comprising:

passing a metallic spacer through respective apertures in at least two ceramic cores, the spacer having a shank and at least one arm extending from the shank to an installed condition wherein the spacer defines a minimum local separation between the at least two cores;

molding a sacrificial pattern material over the metallic spacer and the at least two ceramic cores;

shelling the sacrificial pattern material;

firing a shell formed by the shelling;

casting alloy in the shell; and removing the shell from the cast alloy.

2. The method of claim 1 wherein the passing comprises:

insertion; and relative rotation of the spacer and at least one of the at least two ceramic cores to shift the at least one arm of the spacer to the installed condition.

3. The method of claim 1 wherein:

the apertures are elongate openings between legs of each core.

4. The method of claim 3 wherein:

the at least two cores are at least three cores.

5. The method of claim 4 wherein:
the method casts a multi-walled airfoil element; and
the core legs cast several arrays of spanwise passages stacked between a pressure side of the airfoil and a suction side of the airfoil.
6. The method of claim 4 wherein:
the method casts a heat exchanger; and
the at least three cores are at least four cores arranged in two interleaved tiered arrays with legs of the first array transverse to legs of the second array so as to provide cross-flow heat exchange in the heat exchanger.
7. The method of claim 4 wherein:
for each core, the legs are connected to each other at at least one end.
8. The method of claim 1 wherein:
a preheat melts the spacer.
9. The method of claim 1 further comprising:
removing the sacrificial pattern material before the firing.
10. The method of claim 1 wherein:
the at least two ceramic cores are at least one first ceramic core and at least one second ceramic core; and
the passing comprises passing through the aperture(s) of the at least one second ceramic core after passing through the aperture(s) of the at least one first ceramic core.
11. The method of claim 1 wherein:
said spacer has a first end and a second end wherein in the installed condition the first end extends beyond a surface of the sacrificial pattern material;
the shelling embeds the first end into the shell; and
the firing secures the first end to fix the minimum local separation between the at least two cores.
12. The method of claim 1 wherein:
the spacer has a melting a point of 1200° C. to 1500° C.
13. The method of claim 1 wherein:
the spacer is at least one of platinum or a nickel alloy.
14. The method of claim 13 wherein:
the spacer is of said cast alloy.
15. The method of claim 13 wherein:
the spacer comprises a nickel alloy having at least 50% Ni by weight.
16. The method of claim 13 wherein:
the spacer comprises a material that has a melting point above a cristobalite transformation temperature of a core material.
17. The method of claim 13 wherein:
the spacer comprises a material that has a melting point below a melting point of the cast alloy.
18. The method of claim 13 wherein:
the spacer comprises a material that is soluble in the cast alloy.
19. A casting method comprising:
providing a metallic spacer between two ceramic cores;
molding a sacrificial pattern material over the metallic spacer and two ceramic cores;
shelling the sacrificial pattern material;
firing a shell formed by the shelling;
heating the shell to a casting temperature during which the metallic spacer melts;
after the metallic spacer melts, pouring a casting alloy into the shell; and
removing the shell from the cast alloy, wherein:
the heating of the shell transforms amorphous silica in the two ceramic cores to cristobalite; and
the spacer melts after at least 50% of said amorphous silica in the two ceramic cores have transformed to cristobalite.
20. The method of claim 19 wherein:
the spacer comprises a nickel alloy having at least 50% nickel by weight; and the nickel alloy has a melting point below a melting point of the cast alloy.
21. The method of claim 19 wherein:
the spacer comprises a material that has a melting point of 1200° C. to 1500° C. and below a melting point of the cast alloy.
22. The method of claim 19 wherein:
the providing the metallic spacer is between at least three ceramic cores including said two ceramic cores; and
the molding the sacrificial pattern material is over the metallic spacer and the at least three ceramic cores.

* * * * *